United States Patent [19]
Erdman

[11] 4,015,182
[45] Mar. 29, 1977

[54] REFRIGERATION SYSTEM AND CONTROL THEREFOR

[75] Inventor: David M. Erdman, Fort Wayne, Ind.

[73] Assignee: General Electric Company, Fort Wayne, Ind.

[22] Filed: June 24, 1974

[21] Appl. No.: 482,407

[52] U.S. Cl. .............................. 318/334; 318/471; 62/228; 318/254

[51] Int. Cl.² .................................... H02K 29/00

[58] Field of Search .................. 318/334, 471, 254; 62/228

[56] References Cited
UNITED STATES PATENTS

| | | | |
|---|---|---|---|
| 3,353,076 | 11/1967 | Haines | 318/138 |
| 3,384,801 | 5/1968 | Rodgers | 318/334 |
| 3,531,702 | 9/1970 | Hill | 318/138 |
| 3,577,053 | 5/1971 | McGee | 318/254 |
| 3,581,173 | 5/1971 | Hood et al. | 318/254 |
| 3,633,084 | 1/1972 | Rakes | 318/254 |
| 3,634,873 | 1/1972 | Nishimura | 318/254 |
| 3,780,363 | 12/1973 | Doemen | 318/254 |
| 3,783,357 | 1/1974 | Ichiyanage | 318/138 |
| 3,831,073 | 8/1974 | Tanikoshi | 318/314 |

*Primary Examiner*—B. Dobeck
*Attorney, Agent, or Firm*—Ralph E. Krisher, Jr.

[57] ABSTRACT

A refrigeration system is disclosed as comprising a compressor driven by an electronically commutated D.C. motor for circulating a suitable coolant through a condenser and then an evaporator disposed within a chamber or compartment to be cooled. The system is particularly adapted for use as an air conditioning system for automobiles and recreational vehicles, as portable refrigerating apparatus in recreational vehicles, and refrigerating apparatus for trucks or other transport vehicles. In such applications, a power source such as a battery, alternator, or generator (or rectified alternating current) serves to energize the motor. The motor may be operated by an electronic commutating circuit responsive to the position of the rotor of the D.C. motor for efficiently commutating the energizing signals applied to the stator windings of the brushless D.C. motor. The level of energization is set in accordance with the desired temperature to be maintained by the refrigeration system, whereby the D.C. motor is energized to drive the compressor at a selected speed corresponding to the desired temperature. The degree of stator energization may be controlled by: 1) regulating the output of the power source, or 2) regulating directly the commutating circuit to control the current signals applied to the stator windings.

10 Claims, 7 Drawing Figures

REFRIGERATION SYSTEM AND CONTROL THEREFOR

CROSS-REFERENCE TO RELATED APPLICATIONS

Reference is made to the following, related patent application, which is assigned to the assignee of the present invention and the entire disclosure of which is specifically incorporated herein by reference.

Ser. No. 482,409, entitled "Electronically Commutated Motor and Method Of Making Same" filed in the name of David M. Erdman on the same day as this application.

BACKGROUND OF THE INVENTION

This invention relates to refrigeration systems and, while of other utility, is particularly adapted to such systems for cooling the passenger compartments of automotive vehicles, systems for air conditioning recreational vehicles, systems for cooling portable refrigerators for recreational vehicles, and systems for refrigerating cargo transporters.

In some of the prior systems of the type mentioned, there is typically provided a compressor driven by a vehicle engine through a suitable belt and pulley power take-off. Such a system is inherently wasteful of energy. For example, in many, if not all, automotive applications, the desired degree of cooling is determined for vehicle idling conditions, typically at engine speeds around 600 r.p.m., whereas when the vehicle engine is running at full speed, it may be rotating at 3000 r.p.m. or more. Therefore, it can be seen that the resultant cooling will vary significantly as the engine speed changes. For example, when the vehicle is moving with its engine rotating at an increased speed, the compressor is driven at a significantly higher speed as compared to idling speed. The cooling achieved at the higher vehicle engine speed is typically greater than that required. For these and other reasons, such refrigeration systems comprise compressors of greater capacity and therefore cost, than that required, since a high capacity is needed for idling conditions, although excess capacity exists during normal running periods.

A significant disadvantage of such refrigeration systems is that the excess cooling places a penalty upon the gas mileage of the vehicle. In larger vehicles, the gas mileage penalty has been estimated to be in the order of 10%, whereas in smaller vehicles with smaller engines, the penalty may be even greater. Further, the extra power requirements placed upon the vehicle engine, especially that of a smaller car, present a potential safety hazard in that the accelerating capacity of such a vehicle is significantly reduced when its air conditioning system is in operation.

To compensate for variations, and in particular for increase of the vehicle engine speed, it has been a typical practice to provide bypass means that is selectively operable to regulate the cooling operation of the system's evaporator in accordance with temperatures desired in the compartment to be cooled. However, such apparatus is subject to very high pressure differentials, with consequent leakage as well as the need for very strong mechanical linkages to operate the bypass means which typically take the form of bypass valves.

Further attempts have been made to compensate for the excess capacity of such refrigeration systems by heating the cooled air to be circulated into the passenger compartment of the automotive vehicle. It is apparent that such a process places a double penalty upon the gas mileage of the vehicle motor when so operated. Further, a mechanical device such as a clutch may be inserted between the vehicle motor and the compressor which is cycled ON and OFF to achieve the desired temperature within the passenger compartment. Such a system places a high strain upon not only the clutch so inserted, but also upon the compressor. For example, if the vehicle engine is operated at 3000 r.p.m. and the compressor is at a standstill when the clutch is engaged, the compressor must accelerate at a rapid rate, thus placing an extreme degree of mechanical strain upon the compressor and clutch. When the clutch is of the electromagnetic type, power loss and energy drain is also caused by such clutch.

The periodic turning ON and OFF of an automotive air conditioning refrigeration system causes temperature variations noticeable to the passengers. In typical automobiles, the cooling loss, particularly through the vehicle windows, is quite rapid on a hot day, so that passenger comfort is significantly affected by rapid heating-up and cooling-down of the air within the passenger compartment.

A further problem arising from the mechanical coupling of a vehicle air conditioning system to the vehicle's motor, is that the air conditioning system typically is mounted upon the engine, and that an externally driven shaft must pass through a compressor housing seal so as to drive the compressor. Due to mounting on or near the engine, the vehicle air conditioning system is subjected to considerable vibration. Such air conditioning systems are sealed so that the coolant (typically freon) will not leak. When subjected to such vibration of the vehicle motor, the various seals of the air conditioning system and in particular the seals provided about the compressor shaft, begin to break down and eventually, the coolant escapes.

Similar problems to those described above with respect to automotive vehicle air conditioning systems, exist for RV's (recreational vehicles), many of which are equipped with air conditioning and portable refrigerating units. Typically, such RV's may include two air conditioning systems, one coupled mechanically to the vehicle engine to cool the vehicle while the vehicle is moving, and a second air conditioning unit mounted on the roof to be plugged into a standard 115V power outlet, when the vehicle is parked. In the prior art, it has been found to be more convenient to provide two air conditioning systems rather than to adapt a single air conditioning system to be operative while the motor vehicle is running and when it is parked. Most RV refrigerators are of the gas adsorption type which require leveling of the vehicle; the handling of gas; relighting of a pilot light; high manufacturing cost; and relatively high energy input requirements.

In the case of refrigerated trucks, auxiliary gas engines or other conventional prime movers are coupled to separate compressors. With these systems also, reliability may be a problem due to seal leakage, etc.

Some of the above problems have been recognized in the art as indicated, for example, by U.S. Pat. No. 3,634,873 which issued Jan. 11, 1972. The approach of that patent, however, is in serveral respects similar to old techniques. For example, salient pole winding arrangements are utilized, and maximum speed and efficiency appear to be inherently limited because (among other reasons) of a need to rely on mechanical switching mechanisms.

SUMMARY OF THE INVENTION

Accordingly, one object of the present invention is to control the operation of a refrigeration system to precisely cool the desired volume, whereby the energy required to drive the refrigeration system is minimized.

It is a further object of the present invention to provide an improved vehicular refrigeration system whereby the capacity of its components is matched precisely to the desired cooling output.

It is another object of this invention to provide a refrigeration system particularly adapted for use in a vehicle and for operation without being mechanically coupled with the vehicle's engine.

It is a further object of this invention to provide an improved refrigeration system adapted to be optionally energized by more than one type of power source, e.g. by direct current and alternating current sources.

Yet another object of the present invention is to provide an improved hermetically sealed refrigerant compressor wherein a D.C. motor with a solid state commutation system is used to drive a refrigerant gas compressing mechanism.

In accordance with one form of the present invention, there is disclosed an improved refrigeration system comprising a compressor mechanism for driving a suitable refrigerant through condenser and evaporator units. The compressor mechanism is driven by an electronically commutated D.C. motor which is hermetically sealed therewith in an enclosure, and the speed of which may be detected to provide speed indicating signals to an electronic commutating circuit; in turn, the electronic commutating circuit electronically commutates the D.C. motor. In accordance with teachings of the present invention, a control signal is developed indicative of the desired temperature to be achieved by the refrigeration system and is used to control the degree of the energization of the stator windings of the D.C. motor.

In one illustrative embodiment of the present invention, a suitable temperature sensing element such as a thermostat is used to control the degree of excitation provided by the electronic commutator circuit.

In a further illustrative embodiment of the present invention, a regulator circuit inserted into the refrigeration system is responsive both to the voltage output of the system's power source and to a control signal indicative of the desired temperature for regulating the output of the refrigeration system's power source, whereby the voltage supplied by the source to the electronic commutating circuit and therefore the degree of excitation of the D.C. motor stator windings, is controlled. Further, in such an embodiment, motor speed indicating signals may be applied to the regulator to control the degree of stator winding excitation during start-up.

BRIEF DESCRIPTION OF THE DRAWINGS

Other objects of the present invention and their attendant advantages will become readily apparent from the following description taken in conjunction with the accompanying figures in which like reference characters are used to describe like parts throughout the several views.

DESCRIPTION OF THE PREFERRED EMBODIMENTS

Figure 1:
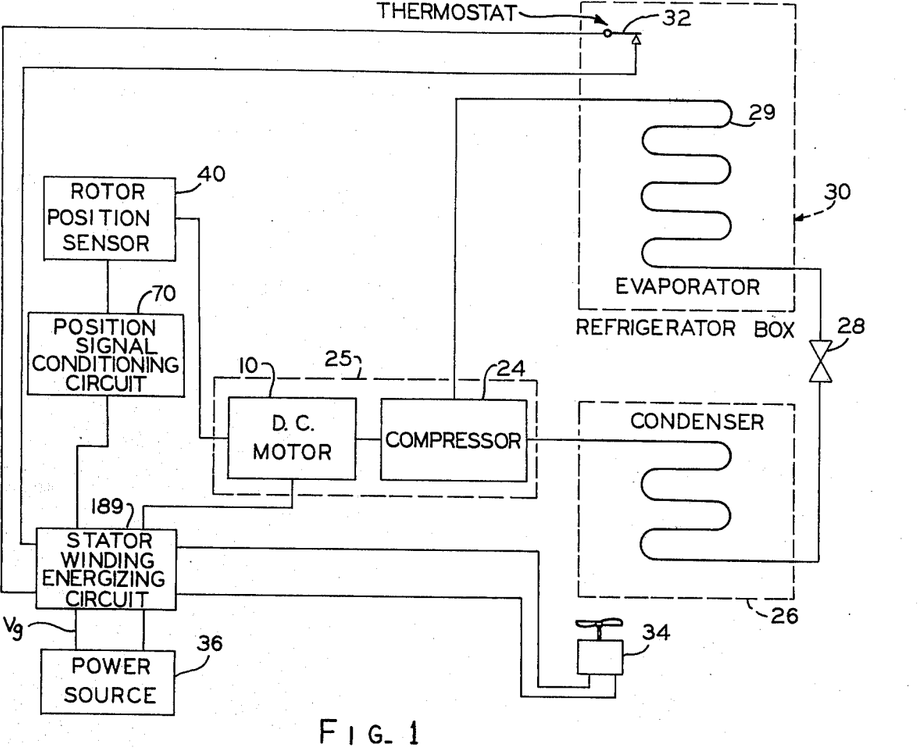
FIG. 1 is a functional block diagram of a refrigeration system, particularly adapted for use in a portable refrigerator, in accordance with teachings of the present invention.

Referring now to the drawings and in particular to FIG. 1, there is illustrated a refrigeration system particularly adapted for use as a portable refrigerator for a recreational vehicle and comprising a hermetically sealed compressor assembly housing 25 that includes an electronically commutated D.C. motor 10 for driving a compressor 24 of any suitable type (e.g., rotary or reciprocating), whereby a suitable refrigerant such as freon is circulated through a condenser 26 and an evaporator coil 29 for cooling the space within a portable refrigerator box 30 and disposed therewithin. The brushless D.C. motor 10 includes stator windings which are energized by a stator winding energizing circuit 189 to which is applied a suitable voltage Vg from a power source 36.

The stator winding energizing circuit 189 effectively commutates the energizing signals to the stator windings in response to a signal or set of signals indicative of the position of the rotor of the D.C. motor as provided by the rotor position sensor 40. In particular, such a signal is applied to a position signal conditioning circuit 70, which provides in sequence a plurality of pulse-like signals as the rotor completes each revolution. A temperature control means in the form of a thermostat 32 is disposed within the refrigerator box 30 and is responsive to the temperature therein for controlling the operation of the stator winding energizing circuit 189, whereby the stator windings of the D.C. motor 10 are energized to a level to effect the desired circulation of coolant by the compressor 24 through the evaporator coil 29 and therefore the desired temperature within the refrigerator box 30. Further, the stator winding energizing circuit 189 controls the operation of a fan 34 for directing air across the condenser 26.

Figure 2:
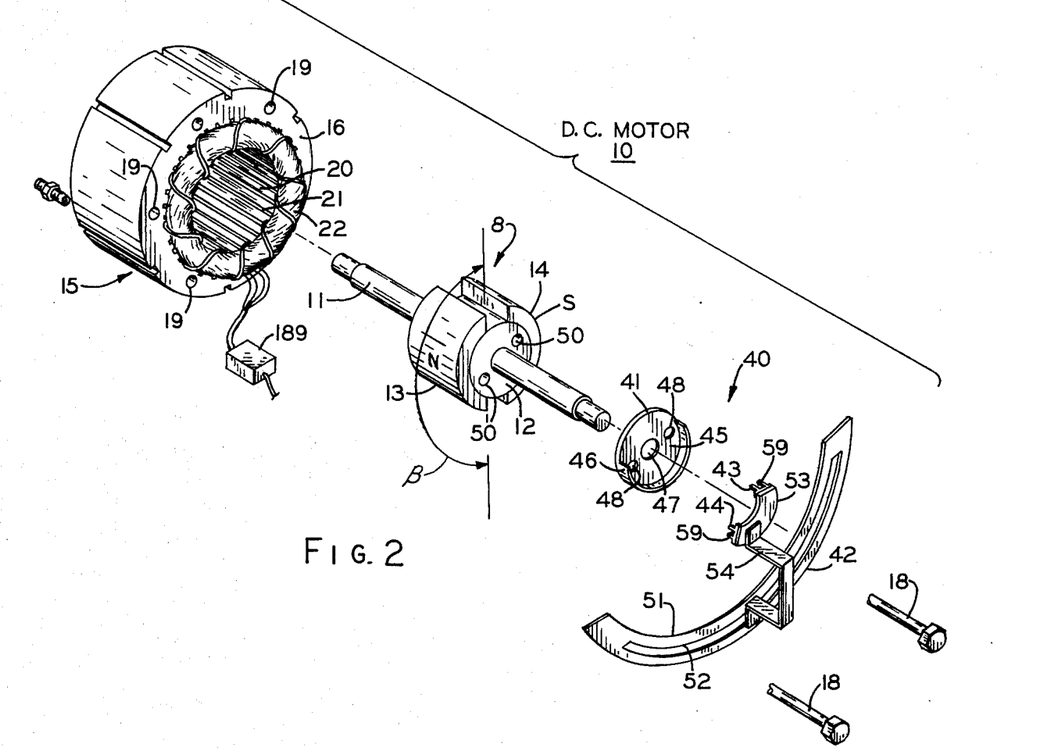
FIG. 2 is an exploded, perspective view of the main elements of a brushless D.C. motor adapted to be incorporated into the refrigeration system of FIG. 1.

Referring to FIG. 2, there is illustrated the component parts of the D.C. motor 10. A permanent magnet rotor 8 is mounted on a shaft 11 which is rotatably supported by suitable bearing means (not shown) within the housing 25 (also not shown). The rotor 8 is magnetized to have at least two magnetic poles. In the illustrated embodiment, the rotor 8 comprises a solid (or laminated if desired) magnetic steel core 12 and a pair of arcuate ceramic magnets 13 and 14 disposed on the periphery of the core in diametrically opposed relationship. The arc length of each ceramic magnet may be varied as taught in my copending application Ser. No. 482,409. Although a two pole motor is shown and described herein, it is to be understood that embodiments of the invention may utilize four pole, six pole, etc. motors. Moreover, while it is preferred to utilize motors embodying the teachings of my application Serial No. 482,409 other brushless D.C. motors may be used in hermetically sealed compressor assemblies or refrigeration systems embodying my invention.

The stationary armature assembly 15 includes a relatively low reluctance magnetic member 16 which may be constructed as taught in my said copending application Ser. No. 482,409, and may include bolts 18 that pass through holes 19. The core includes a plurality of teeth 20 such that axially extending slots 21 are provided to accommodate side turn portions of stator windings 22.

Windings 22 may be wound in place by means of conventional A.C. winding machinery or wound and inserted as taught in my referenced application Ser. No. 482,409. The winding is shown with a spread of 90° (as described in detail in my copending application) and generates mutually perpendicular magnetic fields when energized. The looped ends or end turns of each winding extend beyond the end faces of the magnetic core, and winding ends or taps are connected separately to the control circuit 189 and the associated switching means.

The stationary armature assembly has an axial bore within which is received the rotor 8. The arcuate permanent magnets 13 and 14 are supported on the outer surfaces of the core 12. Magnetization is in the radial direction with radial thickness selected to produce the desired magnetomotive force or to assure that no irreversible magnetization occurs from the fields produced by the current in the stator windings. The axial length of the magnets is dependent on the total flux required. The instantaneous torque curves and the net torque output are dependent on the magnet arc or arc length ($\beta$) of the magnet which preferably is selected for greatest efficiency.

Adjacent one end of the rotor 8 is positioned a shaft position sensor assembly 40 comprising a shutter 41, (including a flat disc-shaped element 45 having a shutter flange 46 extending along the periphery of the disc element) a bracket 42, and optical light coupling sensors 43 and 44, all as taught in my referenced application "Electronically Commutated Motor And Method Of Making Same." The disc element includes a central opening 47; and bolt receiving openings 48 receive mounting bolts that are threaded into openings 50. Of course, as should be readily apparent, other suitable arrangements could be utilized for mounting the shutter to the rotor, so long as rotor position reference signals are generated to indicate the position of the rotor relative to the fixed stator.

The bracket 42 comprises a first arcuate-shaped segment 51 having an elongated slot 52 along its length. Slot 52 permits the bracket to be preselectively adjustably attached to the stator laminations by means of the bolts 18. A second arcuate-shaped segment 53 is supported radially inward of the first segment by means of an interconnecting U-shaped strap or arm member 54. The strap 54 is shaped to pass over the end turns and support the sensors 43 and 44 with a 90° spatial orientation within the end turns of the stator windings and in cooperative relationship with the outward extending flange 46 of the shutter. It should be noted that the sensors are supported within the outermost axial dimension of the winding end turns as well as within the radial dimension thus minimizing the axial length of the motor, the dimension of the strap adding very little to the overall axial length.

Figure 3:
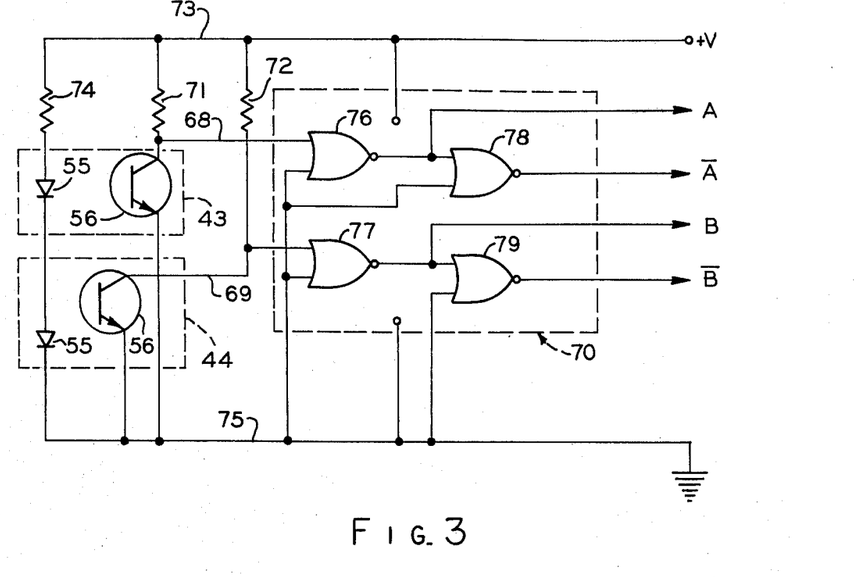
FIG. 3 is a schematic diagram of the position signal processing circuit shown in block form in FIG. 1, for producing sequentially-spaced position control signals indicative of the rotational position of the rotor of the brushless D.C. motor shown in FIG. 2.
Figure 4:
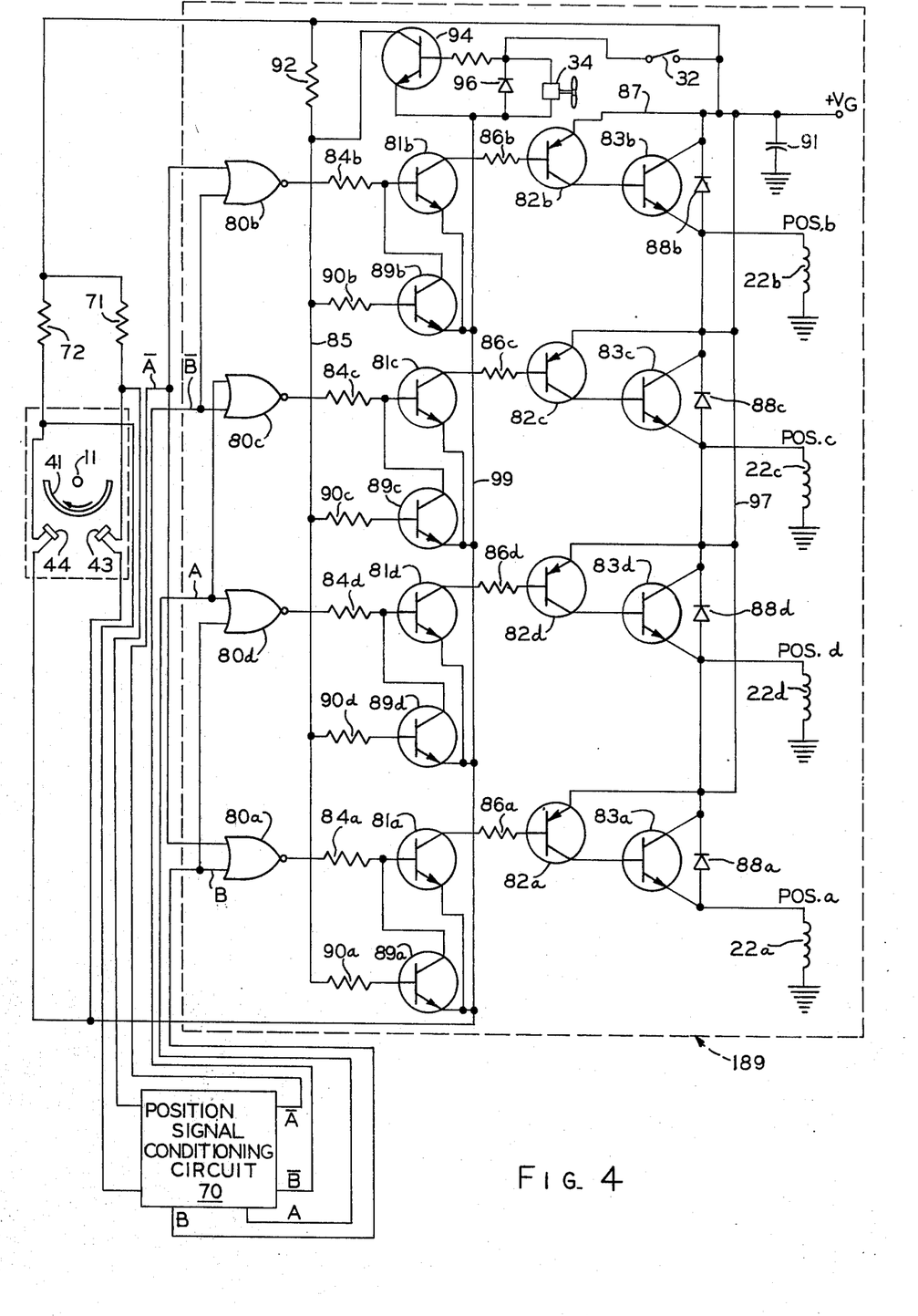
FIG. 4 is a schematic diagram of the solid-state commutating circuit and in particular the stator winding energizing circuit, shown in block form in FIG. 1, for commutating and switching the energizing signals applied to the stator windings of the D.C. motor, connected in a star configuration.

Energization of the stator windings of the brushless D.C. motor 10 is achieved by means of the position signal conditioning circuit 70 and the stator winding energizing circuit 189 shown in block form in FIG. 1 and in detail in FIGS. 3 and 4, respectively. Briefly summarizing the operation of these circuits 70 and 189, it will be apparent that the circuits 70 and 189 receive the output of the optic light sensitive shaft position sensor assembly 40 to derive switching signals for commutation of the stator windings. To this end, the outputs of the sensors 43 and 44 produce two position signals indicative of the position of rotor 8 with respect to the fixed position of the stator windings 22a, 22b, 22c and 22d. The two position signals are applied to the position signal conditioning circuit 70 which develops four control signals A, B, $\overline{A}$ (logic compliment not A) and $\overline{B}$ (logic compliment not B) which correspond to those positions of the rotor 8 when (1) shutter flange 46 is passing through channel 59 of sensor 43, thereby blocking its photosensor; (2) shutter flange 46 is passing through channel 59 of both sensors 43 and 44, thereby blocking both photosensors; (3) shutter flange 46 is passing through channel 59 of sensor 44 to block the photosensor of sensor 44, but is not blocking the photosensor of sensor 43; and (4) shutter flange 46 is clear of both sensors. In this manner, the shutter operates to block or intercept the light from the source of light energy of each optical coupler during one half of each revolution of the rotor, while permitting passage of light energy from each source of light to its associated photosensor during the remaining half of the rotor revolution. However, by supporting the sensors in a 90° spatial relationship, the ON-OFF combination of the sensor provides four (4) distinct position control signals.

Figure 5:
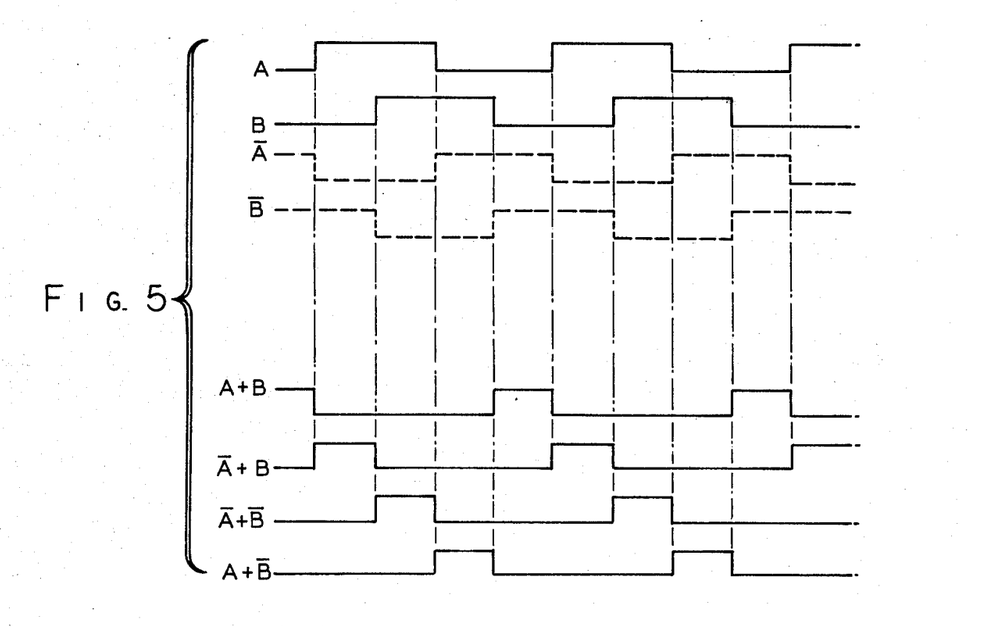
FIG. 5 illustrates graphically the relative relationship between the angular position of the rotor of the brushless D.C. motor and the outputs of the photosensors as shown in FIG. 2, and the switching pulse signals produced as a result of the rotation of the rotor of the brushless D.C. motor.

Referring to FIG. 3, it will be seen that the output of each optical coupler 43, 44 is high when the energy received from the LED 55 is prevented from exciting the associated photo transistor 56, (i.e. when shutter flange 46 passes between an LED and associated photo transistor). Thus, as shown in FIG. 5, a first position signal correspondng to that condition when the coupler 43 is blocked is taken at its collector on line 68 and a second position signal corresponding to that condition when coupler 44 is blocked is taken at its collector on line 69.

As hereinbefore noted, each coupler consists of an LED 55 and a photo transistor 56. The collector for each photo transistor is independently connected through an associated resistor 71 or 72 to a positive bus line 73. Diodes 53 are connected in series and in turn through biasing resistor 74 to the positive bus 73. The emitters of the phototransistors and the series connected diodes are returned to a common ground line 75.

The position signal conditioning circuit 70 includes four NOR gates arranged to develop the four position control signals A, $\overline{A}$, B and $\overline{B}$ which are indicative of the rotational position of the rotor 8 and which are utilized to control current switching in the stator windings. To this end, one input of each NOR gate 76 and 77 is connected to lines 68 and 69, respectively, and the other inputs of each NOR gate 76 and 77 are returned to ground line 75. The outputs of NOR gates 76 and 77 establish the A and B position control signals applied to the second signal conditioning circuit. The A and B control signals are also applied, respectively, to one of the input terminals of NOR gates 78 and 79, the output of which comprises the $\overline{A}$ and $\overline{B}$ position control signals. The other input of each NOR gate 78 and 79 is grounded.

The four position control signals A, $\overline{A}$, B and $\overline{B}$ are applied to the stator winding energizing circuit 89, shown in detail in FIG. 4. The function of the stator winding energizing circuit is to produce four switching signals for sequentially switching the associated stator windings 22a, 22b, 22c and 22d. To this end, each winding is associated with a separate signal channel including its own NOR gate 80, transistor 81 and driving stage comprising transistors 82 and 83. Operation of each channel is identical and to avoid duplication, the description will be limited to the operation of a single channel. The channel for the "a" winding is referred to as the a channel and the associated components in that channel have a numerical reference character followed by the letter a to signify its association with that channel. Thus, the a channel controls switching of winding a, the "b" channel controls switching of winding b, and so forth.

Channel a is shown as the lowermost channel of the second signal conditioning circuit in FIG. 4. NOR gate 80a has its two inputs connected to receive the $\overline{A}$ and B inputs from NOR gates 78 and 77. Likewise, each of the other channels is arranged to receive two position control signals from the position signal conditioning circuit 70 such that the four channels produce four successive switching pulses for each revolution of the rotor, as best shown in the lower half of FIG. 5.

Logic is performed with two inputs for each gate. The gates are connected in such a way that when the output of one NOR gate 80 is a one, the outputs of the other NOR gates are at zero. Gate 80a, for example, has a one output when the $\overline{A}$ and B inputs are both at zero. This occurs just once in a revolution of the shutter 41. Similarly, for gate 80b, its output is a one when the $\overline{A}$ and $\overline{B}$ inputs are at zero. This, again, is a singular combination in each revolution. Gates 80c and 80d are in like manner connected to A, $\overline{B}$ and A, B inputs, respectively.

The switching signals derived from each of the NOR gates 80 are applied through the associated resistor 84 to transistor 81. The emitter of each of the transistors 81 is connected in common to a bus 99, while their collectors are connected through resistances 86 to the base of the corresponding transistors 82. The collector emitter of each transistor 82 is connected, respectively, to the base and collector of the associated transistor 83 forming a conventional Darlington circuit.

Each of the stator windings 22a, 22b, 22c and 22d is connected through the collector-emitter junction of its associated transistor 83 to the positive bus 97. A protective diode 88 is connected across the emitter-collector of each transistor 83 to provide a current path from the associated winding to the positive bus line 87. To this end, the anode of each diode 88 is connected to the high side of the associated winding 22 and the emitter of transistor 83 to insure that the polarity of the diode is such as to allow the return of energy released by the decaying magnetic field of a winding when it is de-energized. The back current generated by the decaying magnetic field is shunted past the transistor through line 97, causing capacitor 91 connected across the positive bus line 87 and ground to charge. The energy stored in capacitor 91 will be returned to the system upon discharge of the capacitor when the next winding is turned on resulting in an overall increase in efficiency of the motor. The improved efficiency may be as high as 10%.

With regard to FIG. 1, it is seen that the thermostat 32, sensitive to the temperature established within the refrigerator box 30, provides a control signal to control means for the stator winding energizing circuit 189. As shown in detail in FIG. 4, the positive voltage Vg (derived from the power source 36) is selectively applied through the switch of thermostat 32 to render control means shown as a transistor 94 conductive. In particular, when the thermostat 32 is subjected to a temperature above a predetermined level, its switch contacts close to apply the voltage Vg to the base of the transistor 94, thereby rendering transistor 94 conductive and effectively interconnecting through a low-impedance path the conductive buses 85 and 99. As shown in FIG. 4, a plurality of transistors 89, one for each of the aforementioned channels, is connected therebetween with their base regions connected through an associated resistor 90 to the bus 85 and their emitters connected directly to the bus 99. Further, each of the transistors 89 has a collector tied to the base of the corresponding transistor 81, while its emitter is connected to the emitter of transistor 81. Thus, when the switch of thermostat 32 is closed, the transistor 94 ties the buses 85 and 99 together, thereby rendering each of the transistors 89 nonconductive. As a result, the corresponding transistor 81 is permitted to be rendered conductive under the control of its NOR gate 80, thereby energizing the stator windings 22a, 22b, 22c and 22d through the transistors 82 and 83. Further, when the thermostat switch is closed, the transistor 94 is rendered conductive, thereby placing a positive voltage across the terminals of the fan motor 34, which is energized to direct air across the condenser coils, as shown in FIG. 1. A protective diode 96 is disposed across the terminals of the fan motor 34.

When the temperature within the refrigerator box 30 (see FIG. 1) falls to the predetermined temperature, the thermostat switch opens thereby removing the positive voltage from the base of the transistor 94, rendering it nonconductive. As a result, the low conductive path between the buses 85 and 99 is removed, thereby permitting the potential established at the emitters of each of the transistors 89 to return to ground. Thus, each of the transistors 89 is rendered conductive, thereby tying the base and emitters of the transistors 81 together, rendering transistors 81 nonconductive. When the transistors 81 are rendered nonconductive, each of the channels is disabled, thereby preventing energization of their corresponding stator winding 22. In this manner, the electronic commutating circuit and in particular the stator winding energizing circuit is controlled in response to sensing a predetermined temperature, whereby the stator windings are de-energized. As a result, the motor 10 is de-actuated and the cooling operation of the refrigeration system turned off until the cooled compartment temperature rises so that the thermostat switch again closes.

Figure 6:
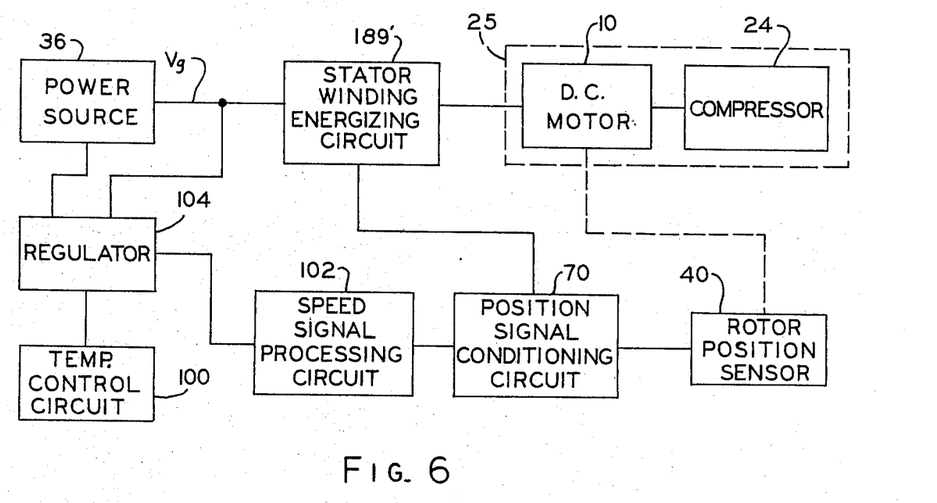
FIG. 6 is a functional block diagram of a refrigeration system particularly adapted for use as an automotive air conditioning system, in accordance with a further embodiment of this invention.

Referring now to FIG. 6, there is shown a further embodiment of the present invention, comprising the motor 10 and compressor 24 which effects circulation of a suitable coolant to the condenser 26 and the evaporator coil 29, as shown in FIG. 1. As described previously, rotation of the rotor of the motor 10 is sensed by a position sensor 40 to apply a rotor position indicating signal to the position signal conditioning circuit 70, described above in detail with respect to FIG. 3. The refrigeration system as shown in FIG. 6 is particularly adapted to be used as an air conditioning system for a passenger vehicle, whereby the cooling output as derived from the system and in particular the compressor 24, may be more accurately controlled while conserving fuel and reducing the capacity of the compressor 24 required.

In the refrigeration system of FIG. 6, outputs are derived from the position signal conditioning circuit 70 and applied to a stator winding energizing circuit 189' to control the commutation of the energizing signals to the stator windings of the motor 10, in a manner similar to that described above, and also to apply corresponding signals to a speed signal processing circuit 102, the level of the output of which is indicative of rotor speed. In turn, the output of the speed signal processing circuit 102 is applied to a regulator 104. As seen in FIG. 6, the output voltage $V_g$ of the power source 36 is applied to the stator winding energizing circuit 189' and also to the regulator 104. In addition, the output of a temperature control circuit 100 is applied to the regulator 104, whereby the output voltage $V_g$ of the power source 36 may be controlled not only as a function of the desired temperature, as determined by the temperature control circuit 100, but also as a function of the speed of the rotor of the D.C. motor 10. By controlling the power source output as a function of rotor speed, the D.C. motor 10 may be started from standstill and brought efficiently up to running speed while limiting the current to the stator windings 22.

The refrigeration system shown in block form in FIG. 6 will now be explained in detail with respect to an illustrative embodiment shown in FIG. 7. The power source 36, which may illustratively be embodied as a battery, alternator, generator, and so forth, provides an output voltage $V_g$ that is applied to the stator winding energizing circuit 189'. As a comparison between FIGS. 7 and 4 indicates, the stator winding energizing circuits 189 and 189' are similar to each other and like numerals will be used to describe like elements. In particular, there are shown four stator windings 22a, 22b, 22c and 22d, each having a separate energizing channel comprised of a NOR gate 80 for logically processing the rotor position signals A, B, $\overline{A}$ and $\overline{B}$ derived from the position signal processing circuit 70, the transistor 81 having an output which is applied through resistor 86 to the base of transistor 82, and a pair of transistors 83 and 114 connected in parallel with their bases tied to the collector output of the transistor 82. Thus, in a manner similar to that explained with regard to the circuit shown in FIG. 4, only one channel is actuated at one time, during a unique position range of the rotor of the D.C. motor. In particular, the output of the NOR gate 80 renders conductive the transistor 81 and therefore, the transistors 82, 83 and 114.

Figure 7:
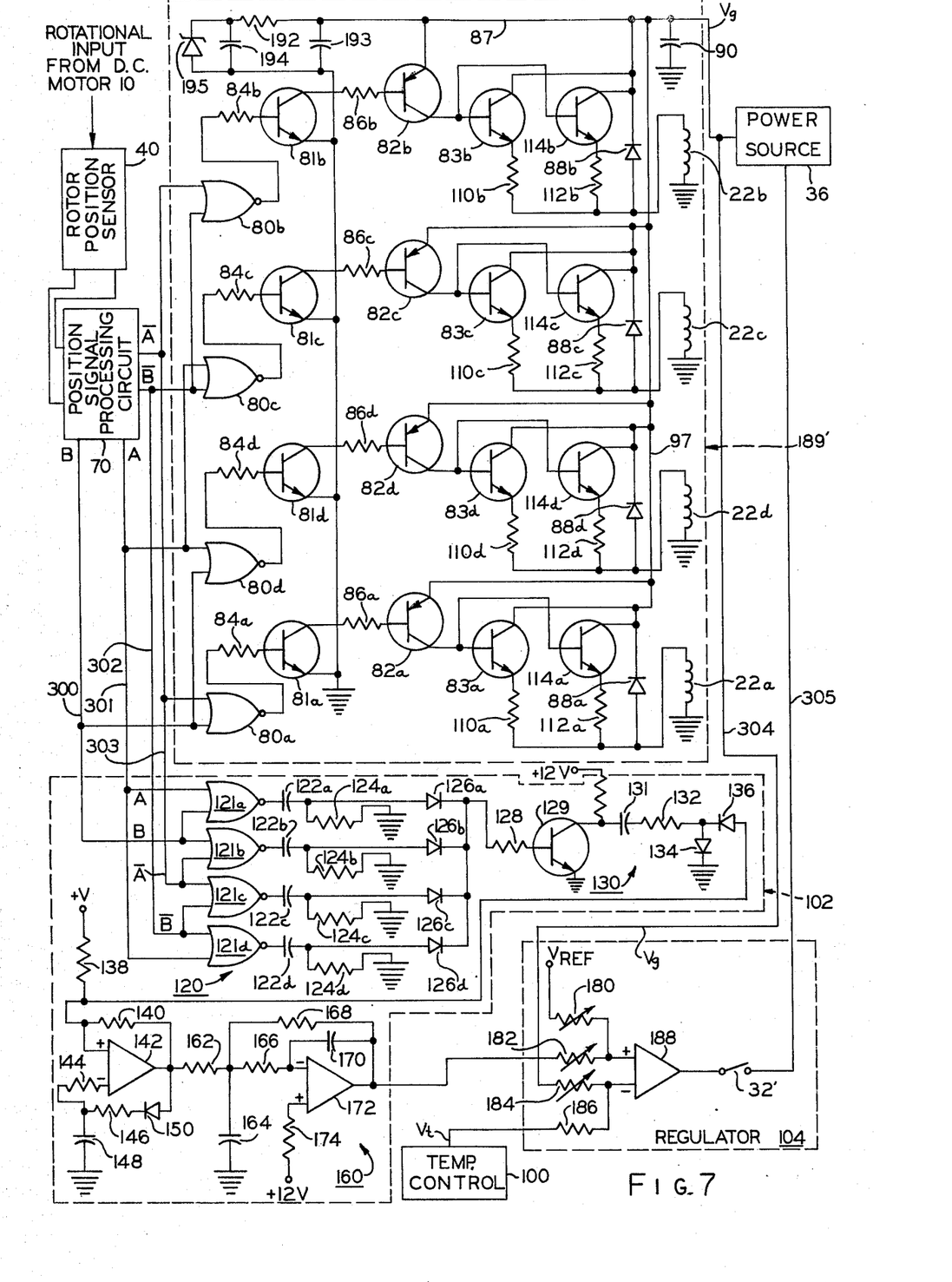
FIG. 7 is a schematic diagram more particularly showing an illustrative embodiment of the circuit components making up the stator winding energizing circuit, the speed signal processing circuit and the regulator circuit shown in block form in FIG. 6.

As seen in FIG. 7, the output voltage $V_g$ of the power source is interconnected by the transistors 83 and 114 of each channel to its corresponding stator winding 22; and when transistors 83 and 114 are rendered conductive, the voltage $V_g$ is applied across the selected stator winding 22. In this manner, each of the stator windings 22a, 22b, 22c and 22d is sequentially energized to effectively commutate the D.C. motor 10.

As shown in block form in FIG. 7 and as explained in detail with respect to FIGS. 3 and 4, the rotor sensor circuit 40 senses the position of the rotor 8 of the D.C. motor 10 to develop an output indicative thereof to be applied to the position signal processing circuit 70. As explained above, the position signal processing circuit 70 generates, as shown in FIG. 5, position indicating signals A, B, $\overline{A}$ and $\overline{B}$ in sequence, each indicating a unique position of the rotor of the brushless D.C. motor. It is noted, however, that the rotor position sensor 40 including the light sensor assemblies and the processing circuitry as described above, may be replaced by an entirely electronic circuit.

As seen in FIG. 7, the position indicating signals A, B, $\overline{A}$ and $\overline{B}$ derived from the position signal processing circuit 70 are applied to the speed signal processing circuit 102 for providing an output indicative of the rotational speed of the rotor 8 of the D.C. motor 10. In particular, the position indicating signals A, B, $\overline{A}$ and $\overline{B}$ are applied to a pulse generating circuit 120 and in particular to a plurality of NOR gates 121, which are selectively energized to provide an output indicative of a unique position of the rotor 8 of the brushless D.C. motor 10.

As shown in FIG. 7, there are four channels, each designated by a separate suffix a, b, c and d for processing the output of its corresponding NOR gate 121. In particular, the output of each NOR gate 121 is filtered by a capacitor 122 and resistor 124 and directed through a corresponding diode 126 and a resistor 128 to the base of a driver transistor 129. Thus, each NOR gate 121 is sequentially actuated to provide an output indicative of a unique position of the rotor 8 to be processed as described and to render conductive the transistor 129, whereby the output taken from the collector of the transistor 129 is a train of pulse-like signals, the frequency of which corresponds to the rotational speed of the motor rotor 8.

Next, the train of pulse-like signals derived from the pulse generating circuit 120 is applied to a one-shot multivibrator circuit 130 for shaping the input train of pulse-like signals into a squarewave of like frequency. In particular, the pulses are coupled through a capacitor 131 and resistor 132 to a first diode 134 for directing the positive portion of the input signal train to ground and for permitting the negative portion to be applied through a backward-biased diode 136 to the plus terminal of an operational amplifier 142. As will be understood, the operational amplifier 142 is connected in a oneshot configuration. In particular, the output of the operational amplifier 142 is connected to its plus terminal through a resistor 140 and to its negative terminal through a diode 150, a resistor 146 and a resistor 144. The point of interconnection between the resistors 144 and 146 is connected to ground through a capacitor 148. Further, a biasing voltage is applied through a resistor 138 to the plus terminal of the operational amplifier 142.

In turn, the squarewave output of the one-shot multivibrator 130 is applied to be integrated by a low-pass filter circuit 160 to provide a D.C. output signal proportional to the speed of the rotor of the brushless D.C. motor 10. In particular, the squarewave input signal is applied through a resistor 162 to charge a capacitor 164 connected to ground. The voltage charge upon the capacitor 164 is coupled through a resistor 166 to the negative terminal of an operational amplifier 172. The positive terminal of the operational amplifier 172 is connected through a resistor 174 to a biasing voltage. Further, the output of the operational amplifier 172 is coupled through a capacitor 170 to its negative input terminal and also through a resistor 168 to the capacitor 164. Essentially, the low-pass filter 160 integrates the input train of pulses to provide a D.C. output, the level of which is indicative of the rotational speed of the rotor 8 of the motor 10.

The D.C. signal indicative of rotor speed as derived from the speed signal processing circuit 102 is applied to the regulator 104 to be compared with a reference signal Vref to provide an output to be applied to the power source 36, whereby the level of the voltage output signal $V_g$ therefrom is controlled accordingly. Further, the temperature control 100 applies to the regulator 104 its output voltage signal $V_t$ indicative of the desired temperature to be maintained by the refrigeration system and therefore the desired level of excitation of the stator windings of, and the speed of, the motor 10.

The output voltage $V_g$ of the power source 36 is fed back and compared with the aforementioned signals. In particular, the output signal of the power source 36 is applied through a variable resistance 184 to a negative terminal of an operational amplifier 188, while the output of the speed signal processing circuit 102 is applied through a variable resistor 182 to the positive terminal of the operational amplifier 188, and the reference voltage Vref is applied through a variable resistor 180 to the positive terminal of the operational amplifier 188. The input voltage $V_t$ is applied through a resistor 186 to the negative terminal of the operational amplifier 188, which compares the input signals to provide an output indicative of the desired voltage level to be generated by the power source 36. In specific embodiments of the invention, where the power source 36 comprises an alternator, the output of the regulator 104 is applied through switching transistor means to the field winding of the alternator, to thereby control the power source 36 to provide the desired output voltage $V_g$.

In operation, the regulator circuit 104 acts essentially as a comparison circuit to compare first the temperature signal $V_t$ derived from the temperature control 100 with respect to the reference signal Vref; whereby the output of the power source 36, and therefore the level of energization of the stator winding 22, is controlled in accordance with the desired degree of cooling as set by temperature control 100. As a result, the motor 10 and therefore the compressor 24 (see FIG. 6), are driven at a desired rate corresponding precisely to the desired degree or amount of cooling. Further, the output of the power source 36 is fed back and also compared by the operational amplifier 188 with respect to the reference voltage Vref, to regulate the output of the power source 36.

A resistor 192 connected in positive bus line 87, together with capacitors 193, 194 and a 15-volt Zener diode 195 provides a protective filter network for the circuit components against the possibility of line 87 being raised to a voltage great enough to destroy the solid state components. This could occur, for example, if the motor is run off a battery charger that provides peak voltages of greater than 15 volts.

As suggested by FIG. 7, the switch contacts of a thermostat 32′ disposed within the compartment being cooled are disposed in circuit between the output of the operational amplifier 188 and the power source 36 to selectively permit or prevent the application of a control signal from the regulator 104 to the power source 36, so that a desired compartment temperature or temperature range may be maintained. For example, with the thermostat contacts open, the power source or supply 36 is deactuated, thereby terminating or preventing energization of the stator windings 22 until the temperature within the compartment to be cooled rises to a level at which the contacts of thermostat 32′ are closed to complete the circuit between the operational amplifier 188 and the power source 36.

As described above with respect to FIG. 7, the regulator 104 responds to a signal indicative of the speed of the rotor 8 of the motor 10, to provide a corresponding control signal to the power source 36 whereby the output thereof is proportional to the speed of the D.C. motor. Thus, the current drawn through the stator windings 22a, 22b, 22c and 22d is dependent upon the power source output $V_g$ and therefore the speed at which the rotor 8 is rotating. Such regulation permits a start-up of the brushless D.C. motor from a standstill condition to a running speed to ensure limiting the current drawn by the stator windings 22 while rotating at relatively low speeds.

For example, during the start-up operation of the D.C. motor 10, the stator windings 22 of the motor may draw on the order of 60 amps. By contrast, the normal current drain at normal operating speeds is in the order of 50 amps. Thus, the current drawn during start-up operations is limited so that extremly high currents will not be initially drawn, thereby possibly damaging the associated driving transistors and other components making up the control circuits of this system.

Thus, there has been shown and described a refrigeration system including a hermetically sealed housing that includes a compressor rotatively driven by a D.C. motor. Significantly, the stator windings of the D.C. motor are energized or commutated electronically in accordance with the desired temperature to be established within the chamber or compartment to be cooled by the refrigeration system. Thus, the power required to drive the brushless D.C. motor is conserved in that the cooling (and therefore the power) required to drive the motor are limited to the desired amount of cooling. Further, the size of the motor and compressor is designed to achieve only the desired amount of cooling and do not need to be of excessive capacity because of an inherent inability to precisely control the rotational input into the compressor of the refrigeration system. This contrasts with previously known refrigeration systems adapted for use in vehicles that typically are driven mechanically from the vehicle engine. Such prior refrigeration systems of necessity have heretofore been designed to have adequate capacity at a relatively low idling speed, and when the vehicle engine is operating at a normal running speed, excess cooling capacity generated.

The benefits of using systems utilizing the teachings of the present invention include: (1) reduced size of motor and compressor required; and (2) savings in terms of the power consumed by a vehicle in that the degree of stator energization is precisely controlled so that the refrigeration system is not operated to provide more cooling than required. Thus, when such a refrigeration system is used in a vehicle, the gas mileage of the vehicle is improved. Furthermore, no direct mechanical drain is placed upon the vehicle motor, so the acceleration of the vehicle may be improved.

Further, refrigeration systems embodying forms of the invention are particularly adapted for use with recreational vehicles and may be used while the recreational vehicle is being driven as well as while it is parked. In such cases, the refrigeration system, which does not depend on a direct mechanical linkage to a vehicle engine, may be electronically energized by the vehicle alternator while the recreational vehicle is being driven, and through a step-down transformer and rectifying circuit or battery charger (when the vehicle is parked) from a standard 115-volt, 60-cycle outlet.

Still other advantages and applications should also now be apparent. For example, some present room air conditioners and household refrigerators may be damaged by low voltage or "brown out" conditions. However, if the motors (including compressor motor) therein are constructed as taught herein (rather than being induction type motors) and operated with rectified voltage; low voltage conditions would not be so inherently destructive. Moreover, appliances such as refrigerators and air conditioners could be provided whose use would not be restricted by a particular power line frequency. For example, compressor assemblies or motors embodying my invention would operate in substantially the same predictable manner from a rectified 60 Hz source as well as a 50 Hz source. Therefore, appliances produced for primary use in a country having one of such power supply frequencies could be utilized in other countries having different power supply frequencies.

A still further advantage is that the speed of the compressor may be easily varied by varying the voltage applied thereto. In effect, this provides a variable capacity (in terms of BTU/hour) refrigeration system; and this in turn provides improved convenience and comfort in air conditioning applications.

For example, on a hot, humid day, maximum motor speed (and thus capacity) would be desired to achieve satisfactory cooling and dehumidification. On the other hand, on a cool but humid day, the motor would be run at a slower speed to reduce the refrigeration capacity so that sufficient dehumidification may be accomplished without excessive cooling effect.

Table I is presented to provide an indication of the advantageous results that may be obtained when using the teachings presented herein.

Table I

| Speed, RPM | Torque, Oz-Ft | Efficiency, % |
|---|---|---|
| 6500 | 3.5 | 91.7 |
| 6000 | 7.2 | 86.7 |
| 5500 | 11.7 | 83.9 |
| 5000 | 16.9 | 77.5 |
| 4500 | 24.0 | 76.5 |

Table I-continued

| Speed, RPM | Torque, Oz-Ft | Efficiency, % |
|---|---|---|
| 4000 | 31.8 | 69.0 |
| 3500 | 40.7 | 63.0 |
| 3000 | 50.6 | 60.8 |

The data of Table I was obtained by testing one motor that is useable in embodiments of the present invention and that was operated from a 40-volt D.C. supply.

The motor utilized a standard stator lamination design that is used commercially in induction motor applications. The lamination was similar (although not exactly identical) to the lamination shown in FIG. 2 of my application Ser. No. 482,409. The bore of the core was about 2.65 inches with a stack height of about 4 inches. The core had 24 slots, and carried distributed bifilar wound copper magnet wire winding side turn portions. Eight winding coil groups total (four bifilar coil groups) were used. Each coil group included three coils and each coil comprised five turns of about 0.05 diameter (uninsulated diameter) copper wire. The coils of each coil group spanned, from outer to inner coils respectively, 11, 9, 7 teeth respectively. Thus, the "spread" of an associated pair of coil groups was six slots or 90 mechanical degrees. It thus will be understood that every slot contained ten conductors (five bifilar conductor pairs).

The rotor magnets were formed of ferrite magnet material from Allen Bradley Co. and designated as M-8 material. The arc length of each of the two magnets used was 142 mechanical degrees; the thickness was about 0.29 inches; and the axial length was about 4 inches. The magnets were epoxy bonded to a solid, soft iron rotor core and the assembled rotor had an outer diameter of about 2.62 inches. Commutation and sensing was accomplished with circuits substantially identical to those shown herein. The actual circuit components (i.e. transistors, resistors, capacitors, etc.) were commonly available types and were selected to have only sufficient voltage and current ratings and gain to supply up to 60 amperes to the motor windings. The motor was commutated with a 22 electrical degree advance. Since the motor was a two-pole motor, electrical degrees were of course equal to mechanical degrees.

Accordingly, while the invention has been described in connection with different embodiments, variations will be readily apparent to those skilled in the art from a reading of the foregoing description, and the invention is to be interpreted only by the claims appended hereto and forming a part of this specification.

What I claim as new and desire to secure by Letters Patent of the United States is:

1. A refrigeration system comprising a compressor assembly including a compressor mechanism for circulating a refrigerant through an evaporator and a D.C. motor coupled with said compressor mechanism and comprising a stationary armature core having a longitudinal axis, at least one excitable winding disposed on said armature core to produce at least one magnetic field, and a permanent magnet rotor adapted to rotate about said longitudinal axis in response to the at least one magnetic field produced by said winding; electronic commutating means for selectively switching a source voltage to energize in sequence different portions of said winding, whereby said D.C. motor is efficiently energized; temperature control means for providing an output indicative of the desired temperature to be maintained by said refrigeration system; and control means responsive to the temperature control means output for controlling the stator winding energization in accordance with the desired temperature; said system further including a power source controllable for providing a variable source voltage, and said control means comprising regulator means responsive to the output of said temperature control means for controlling the output of said power source in accordance with the desired temperature.

2. The refrigeration system as claimed in claim 1, wherein the source voltage is coupled in freedback to said regulator means for controlling the output voltage of said power source.

3. The refrigeration system as claimed in claim 1, wherein there is included means coupled to the rotor of the D.C. motor for providing an output indicative of rotor speed, and the regulator means is responsive to the rotor speed output for controlling the power source to provide a source voltage in accordance with the rotational speed of the rotor.

4. A refrigeration system comprising a compressor assembly including a compressor mechanism for circulating a refrigerant through an evaporator and a D.C. motor coupled with said compressor mechanism and comprising a stationary armature core having a longitudinal axis, a winding comprising a plurality of excitable stator winding portions disposed on said armature core to produce at least one magnetic field, and a permanent magnet rotor adapted to rotate about said longitudinal axis in response to the at least one magnetic field produced by said winding; electronic commutating means for selectively switching a source voltage to energize in sequence said stator winding portions, whereby said D.C. motor is efficiently energized; temperature control means for providing an output indicative of the desired temperature to be maintained by said refrigeration system; and control means responsive to the temperature control means output for controlling the stator winding energization in accordance with the desired temperature; said electronic commutating means comprising position detector means responsive to the position of said rotor of said D.C. motor to provide an output indicative thereof, and stator energizing means responsive to the rotor position output for selectively switching in sequence the source voltage to each of said plurality of stator winding portions; said stator energizing means comprising a plurality of channels corresponding to each of the plurality of the stator winding portions, each of said channels including a switch means responsive to the output of said temperature control means for controlling the energization of its corresponding stator winding portion; and wherein said position detector means provides a plurality of output signal indicative of selected positions of said rotor as it rotates through a single rotation, and each of said channels includes a NOR gate responsive to at least two of the position indicating signals to derive a unique output indicative of a corresponding rotor position, and said switch means is responsive to the output of said temperature control means for rendering said channel inoperative to energize its corresponding stator winding portion.

5. The refrigeration system as claimed in claim 4, wherein each of said channels includes second switch means responsive to the output of said NOR gate for applying the output of said power source to its corresponding stator winding portion, the output of said NOR gate is connected to the base terminal of a first transistor, and said first transistor is responsive to the output of said NOR gate for rendering said second switch means conductive; said first-mentioned switch means of each channel comprising a second transistor, said second transistor of each channel being connected in common to a first bus and having its collector element coupled to the base of said first transistors of its channel and an emitter element coupled in common to a second bus; said system further including third switch means interconnected between said first and second buses and responsive to said temperature control means for presenting a low conductive path between said first and second buses, whereby said second transistor is rendered nonconductive to permit that channel to energize its corresponding stator winding portion.

6. The refrigeration system as claimed in claim 4, further including a fan that is energized to direct a cooling medium over said condenser of the refrigeration system.

7. A refrigeration system comprising a compressor assembly including a compressor mechanism for circulating a refrigerant through an evaporator and a D.C. motor coupled with said compressor mechanism and comprising a stationary armature core having a longitudinal axis, at least one excitable winding disposed on said armature core to produce at least one magnetic field, and a permanent magnet rotor adapted to rotate about said longitudinal axis in response to the at least one magnetic field produced by said winding; electronic commutating means coupled to the output of a power source for selectively switching a source voltage to energize in sequence different portions of said winding, whereby said D.C. motor is efficiently energized; temperature control means for providing an output indicative of the desired temperature to be maintained by said refrigeration system; and control means responsive to the temperature control means output for controlling the stator winding energization in accordance with the desired temperature; said system further including regulator means responsive to the output of the temperature control means for generating and applying an output to said power source, whereby the level of the voltage applied from the power source is controlled so that the stator windings are energized to a desired level corresponding to the temperature set by the temperature control means.

8. The refrigeration system as claimed in claim 7, wherein voltage from the power source is applied to said regulator means, and said regulator means includes means for comparing the source voltage with a reference voltage, for effecting control of the voltage applied from the power source to effect the desired voltage level applied therefrom.

9. The refrigeration system as claimed in claim 8, wherein there is included a position signal processing circuit for providing an output indicative of the rotor position of said D.C. motor, and a speed signal processing circuit, responsive to the output indicative of the rotor position for providing a rotor speed output, the level of which is indicative of the speed of the rotor, said regulator means being responsive to the rotor speed output for providing an output for controlling the voltage applied to the system in accordance with the motor rotor speed.

10. The refrigeration system as claimed in claim 9, wherein the speed signal processing circuit comprises a monostable vibrating circuit responsive to the output of the position signal processing circuit to provide a substantially squarewave output of a frequency corresponding thereto, and an integrating circuit responsive to the aforementioned signal for providing a D.C. output of a level corresponding to the speed of the rotor.

* * * * *